United States Patent
Li

(10) Patent No.: US 12,053,730 B2
(45) Date of Patent: Aug. 6, 2024

(54) DEHUMIDIFIER

(71) Applicants: GD MIDEA AIR-CONDITIONING EQUIPMENT CO., LTD., Foshan (CN); MIDEA GROUP CO., LTD., Foshan (CN)

(72) Inventor: Weiming Li, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 472 days.

(21) Appl. No.: 17/299,173

(22) PCT Filed: Apr. 13, 2020

(86) PCT No.: PCT/CN2020/084377
§ 371 (c)(1),
(2) Date: Jun. 2, 2021

(87) PCT Pub. No.: WO2021/169002
PCT Pub. Date: Sep. 2, 2021

(65) Prior Publication Data
US 2022/0314153 A1 Oct. 6, 2022

(30) Foreign Application Priority Data

Feb. 27, 2020 (CN) .......................... 202010126360.1
Feb. 27, 2020 (CN) .......................... 202020222372.X

(51) Int. Cl.
*B01D 53/22* (2006.01)
*B01D 46/00* (2022.01)
(Continued)

(52) U.S. Cl.
CPC ...... *B01D 46/0031* (2013.01); *B01D 46/0005* (2013.01); *B01D 46/4227* (2013.01); *B01D 46/58* (2022.01); *B01D 53/26* (2013.01)

(58) Field of Classification Search
CPC ............ B01D 46/4227; B01D 46/0005; B01D 46/0031; B01D 46/58; B01D 53/26
See application file for complete search history.

(56) References Cited

U.S. PATENT DOCUMENTS 3,277,636 A * 10/1966 Hemmerlein .......... F24F 3/1411
96/152
3,724,177 A * 4/1973 Grote ..................... B01D 53/02
96/132
(Continued)

FOREIGN PATENT DOCUMENTS

CA 3126311 A1 * 6/2021 .............. F24F 13/20
CN 201242224 Y 5/2009
(Continued)

OTHER PUBLICATIONS

Chen Machine translation of CN106288306A, 12 pages (Year: 2017).*
(Continued)

*Primary Examiner* — Anthony R Shumate
(74) *Attorney, Agent, or Firm* — Anova Law Group, PLLC

(57) ABSTRACT

A dehumidifier comprising: a water tank with a mounting port facing upward, a machine body including an air inlet and a filter net slot beside the air inlet, and a filter net removably inserted in the filter net slot and covering the air inlet. The machine body is configured to be in one of a plurality of states including an idle state in which the machine body is at least partially accommodated in the water tank through the mounting port and a working state in
(Continued)

which the machine body is extended out relative to the water tank through the mounting port.

13 Claims, 8 Drawing Sheets

(51) Int. Cl.
*B01D 46/42* (2006.01)
*B01D 46/58* (2022.01)
*B01D 53/26* (2006.01)

(56) References Cited

U.S. PATENT DOCUMENTS

| | | | | |
|---|---|---|---|---|
| 4,050,262 | A | * | 9/1977 | Mehnert ............. B01D 5/0039 62/93 |
| 9,718,564 | B1 | * | 8/2017 | Beckman ................. B64F 5/40 |
| 10,076,723 | B1 | * | 9/2018 | Anthony .................. F25D 5/02 |
| 10,969,124 | B2 | * | 4/2021 | Scovazzo ............... B01D 53/30 |
| 10,982,899 | B1 | * | 4/2021 | Gelardi .................. B01D 50/20 |
| 2016/0097547 | A1 | * | 4/2016 | Selg ................... B01D 46/4227 55/357 |
| 2018/0180307 | A1 | * | 6/2018 | Owejan ................ B01D 61/366 |
| 2018/0265295 | A1 | * | 9/2018 | Beckman ................ B61L 27/14 |
| 2018/0265296 | A1 | * | 9/2018 | Beckman ........... G06Q 30/0205 |
| 2023/0120721 | A1 | * | 4/2023 | Canovali ............. B01D 1/0011 210/244 |

FOREIGN PATENT DOCUMENTS

| | | |
|---|---|---|
| CN | 203595184 U | 5/2014 |
| CN | 106288306 A | 1/2017 |
| CN | 206055925 U | 3/2017 |
| CN | 107449059 A | 12/2017 |
| CN | 110748987 A | 2/2020 |
| CN | 110748988 A | 2/2020 |
| CN | 110748989 A | 2/2020 |
| EP | 2021698 A1 | 11/2017 |
| JP | S59183228 A | 10/1984 |
| WO | 2019214154 A1 | 11/2019 |

OTHER PUBLICATIONS

World Intellectual Property Organization (WIPO) International Search Report and Written Opinion for PCT/CN2020/084377 with translation Jul. 23, 2020 15 Pages.
Canadian Intellectual Property Office The Office Action For CA Application No. 3,124,452 Oct. 31, 2022 4 Pages.
The European Patent Office (EPO) Extended Search Report for EP Application No. 20888725.Oct. 7, 21, 2020 12 Pages.

* cited by examiner

DEHUMIDIFIER

CROSS-REFERENCE TO RELATED APPLICATIONS

This application is a National Stage Entry under 35 U.S.C. § 371 of International Application No. PCT/CN2020/084377, filed Apr. 13, 2020, which claims priority to Chinese patent application Nos. 202010126360.1 and 202020222372.X, both entitled "Dehumidifier" and filed on Feb. 27, 2020. The disclosures of the aforementioned applications are hereby incorporated by reference in their entireties.

FIELD

The application relates to the technical field of dehumidification equipment, in particular to a dehumidifier.

BACKGROUND

For a dehumidifier, a filter net is usually provided at the air inlet to filter the air entering the dehumidifier. At present, in a common dehumidifier, a filter net is usually provided inside a machine body. When the filter net is to be cleaned or replaced, a shell of the machine body usually needs to be disassembled to remove the filter net, resulting in complicated disassembly and assembly process of cleaning or replacing the filter net, which affects the user experience.

SUMMARY

The main purpose of the present application is to provide a dehumidifier, aiming at improving convenience of disassembly and assembly for cleaning or replacing a filter net.

To achieve the above purpose, the present application provides a dehumidifier including:
- a water tank with a mounting port facing upward;
- a machine body having an idle state in which the machine body is at least partially accommodated in the water tank through the mounting port, and a working state in which the machine body is extended out relative to the water tank through the mounting port, the machine body being provided with an air inlet and a filter net slot beside the air inlet; and
- a filter net removably inserted in the filter net slot and covering the air inlet.

Optionally, the machine body includes a side wall, and the air inlet is formed on the side wall; the filter net slot comprises an upper slot for being inserted with an upper side of the filter net and a lower slot for being inserted with a lower side of the filter net.

Optionally, the filter net slot is provided in the machine body, and the side wall is formed with a filter net mounting port for inserting the filter net.

Optionally, the machine body further includes a top cover connected to an upper end of the side wall and a water receiving tray connected to a lower end of the side wall, the upper slot is arranged on the top cover and the lower slot is arranged on the water receiving tray.

Optionally, two upper guide rails are formed side by side on the top cover at an interval, to form the upper slot between the two upper guide rails; and/or, two lower guide rails are formed side by side on the water receiving tray at an interval to form the lower slot between the two lower guide rails.

Optionally, the side wall includes a first side wall, a second side wall, and a third side wall connected in sequence, the first side wall is opposite to the third side wall, each of the first side wall, the second side wall, and the third side wall is formed with an air inlet.

Optionally, the filter net includes two filter subnets spliced in a circumferential direction of the machine body, one of the two filter subnets covers the air inlet on the first side wall and a portion of the air inlet on the second side wall, and the other one of the two filter subnets covers another portion of the air inlet on the second side wall and the air inlet on the third side wall; and
- each of the first side wall and the third side wall is formed with a filter net mounting port for loading the two filter subnets respectively.

Optionally, one end of each of the two filter subnets is configured with a blocking member, and another end of each of the two filter subnets is inserted into the filter net slot from the filter net mounting port until the blocking member blocks the filter net mounting port.

Optionally, the blocking member is configured with a handled formed in a concave manner.

Optionally, an anti-disengagement structure is provided between each of the two filter subnets and the machine body.

Optionally, the anti-disengagement structure includes a buckle hole provided on the filter subnet and a buckle provided on an inner side of the filter net mounting port, and the buckle is engaged in the buckle hole to restrict the filter subnet from disengaging from the filter net mounting port.

Optionally, a protective baffle spaced apart from the filter net mounting port and opposite to the filter net mounting port is provided in the machine body.

According to the technical scheme of the present application, a filter net slot is provided beside the air inlet of the machine body for the filter net to be drawably inserted, so that when the filter net is to be cleaned or replaced, an outer shell of the machine body does not need to be disassembled, and only the filter net needs to be disassembled by pulling out the filter net from the filter net slot, so that the filter net is removed. The convenience of disassembly and assembly for cleaning or replacing the filter net of the dehumidifier, and the user experience are improved. In addition, in the dehumidifier of the present application, the machine body is extended out relative to the water tank in the working state, so that the air outlet on the machine body has a higher position, the dehumidified air can be discharged to a higher position, and the dehumidified air can be spread to the whole indoor space faster. In the idle state, the machine body can be accommodated in the water tank as much as possible, so that the overall center of gravity of the dehumidifier is lower, making the placement of the dehumidifier more stable, reducing the falling probability of the dehumidifier, and also reducing the overall occupied space for the dehumidifier to be placed in the idle state, thus facilitating users to place the dehumidifier.

BRIEF DESCRIPTION OF DRAWINGS

In order to explain more clearly the embodiments of the present application or the technical solutions in the related art. The following will briefly describe the drawings needed to be used in the description of embodiments or the related art. Apparently, the accompany drawings described below are merely some embodiments of the present application, and other drawings may be obtained without creative effort by one of ordinary skill in the art in accordance with the structure shown in these drawings.

DESCRIPTION OF REFERENCE NUMERALS IN THE DRAWINGS

Figure 1:
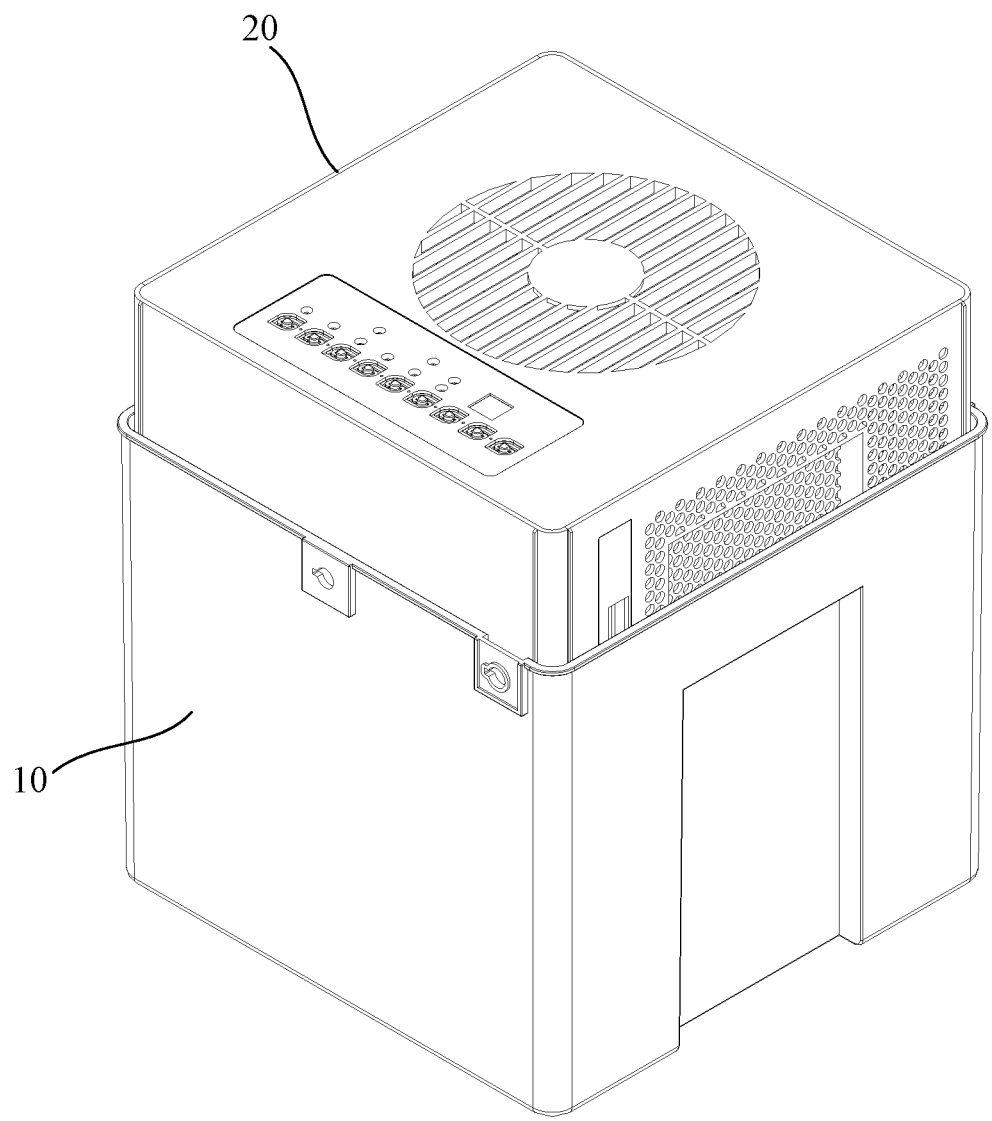
FIG. 1 is a schematic structural view of a dehumidifier according to an embodiment of the present application.

| Reference Numeral | Name | Reference Numeral | Name |
|---|---|---|---|
| 10 | Water tank | 20 | Machine body |
| 21 | Side wall | 22 | Top cover |
| 23 | Water receiving tray | 24 | Buckle |
| 25 | Protective baffle | 211 | First side wall |
| 212 | Second side wall | 213 | Third side wall |
| 214 | Fourth side wall | 201 | Air inlet |
| 202a | Upper Slot | 202b | Lower Slot |
| 203 | Filter net mounting port | 221 | Upper guide rail |
| 231 | Lower guide rail | 30 | filter net |
| 31 | Filter subnet | 311 | Blocking member |
| 312 | Handle | 313 | Buckle hole |
| 31a | Subnet body | 31b | Subnet flanging |
| 40 | Evaporator | 50 | Condenser |

The realization of the purposes, functional features and advantages of the present application will be further explained with reference to the accompanying drawings in combination with the embodiments.

DETAILED DESCRIPTION OF THE EMBODIMENTS

The technical aspects of the embodiments of the present application will be described clearly and completely in conjunction with the accompanying drawings of the embodiments of the present application. It is obvious that the described embodiments are only some of the embodiments of the present application, and not all of the embodiments. Based on the embodiments in this application, all other embodiments obtained by those of ordinary skill in the art without creative labor fall within the claimed scope of this application.

It should be noted that if there is a directional indication (such as up, down, left, right, front, rear, etc.) in the embodiments of the present application, the directional indication is only used to explain the relative positional relationship and movement between components under a specific attitude (as shown in the drawings). If the specific attitude changes, the directional indication will also change accordingly.

In addition, if there are descriptions relating to "first," "second" and the like in embodiments of the present application, the descriptions of "first," "second" and the like are for descriptive purposes only and should not be understood to indicate or imply their relative importance or imply the number of indicated technical features. Thus, a feature as associated with "first" and "second" may explicitly or implicitly include at least one such feature. In addition, the meaning of "and/or" appearing in the whole text includes three parallel schemes, taking "A and/or B" as an example, it includes scheme A, scheme B, or schemes A and B both satisfied. In addition, the technical solutions between various embodiments can be combined with each other, but it must be based on the realization of those skilled in the art. When the combination of technical solutions contradicts or cannot be realized, it should be considered that such combination of technical solutions does not exist and is not within the scope of protection claimed by this application.

The present application provides a dehumidifier.

As shown in FIGS. 1 to 8, in one embodiment of the present application, the dehumidifier includes:

a water tank 10 having a mounting port facing upwardly;

a machine body 20 having an idle state in which the machine body 20 is at least partially housed in the water tank 10 through the mounting port, and a working state in which the machine body 20 is protruded relative to the water tank 10 through the mounting port; the machine body 20 being configured with an air inlet 201 and a filter net slot provided beside the air inlet 201; and a filter net 30 removably inserted in the filter net slot and covering the air inlet 201.

According to the technical solution of the present application, a filter net slot provided beside the air inlet 201 is provided on the machine body 20 for the filter net 30 to be pulled and inserted, so that when the filter net 30 is to be cleaned or replaced, it is not needed to disassemble a shell of the machine body 20, but only needed to pull the filter net 30 out of the filter net slot to disassemble the filter net 30. The convenience of disassembly and assembly to clean or replace the filter net 30 of the dehumidifier is improved, and the user experience is improved. In addition, in the dehumidifier of the present application, the machine body 20 extends out relative to the water tank 10 in the working state, so that an air outlet on the machine body 20 has a higher position, and dehumidified air can be discharged to a higher position and spread to a whole indoor space faster. In the idle state, the machine body 20 can be accommodated in the water tank 10 as much as possible, so that an overall center of gravity of the dehumidifier is lower, making a placement of the dehumidifier more stable, reducing probability of falling of the dehumidifier, and also reducing an overall occupied space for the dehumidifier to be placed in the idle state, and facilitating users to place the dehumidifier.

In this embodiment, optionally, the mounting port is configured as an open port, so that a side wall 21 of the water tank 10 can provide a downward guide for reception of the machine body 20, and the open port can facilitate receiving of water droplets formed by dehumidification. However, the present design is not limited to this, in other embodiments, the mounting port may not be provided as an open port.

As shown in FIGS. 2 to 8, further, the machine body 20 includes the side wall 21. The air inlet 201 is provided on the side wall 21. The filter net slot includes an upper slot 202a for inserting an upper side of the filter net 30, and a lower slot 202b for inserting a lower side of the filter net 30. It can be understood that in this embodiment, the filter net slot extends in a transverse direction or substantially in the transverse direction, that is, the filter net 30 is inserted into the filter net slot in a transverse pulling manner, and a user can remove the filter net 30 by applying a transverse pulling force to the filter net 30. However, the present design is not limited to here, in other embodiments, the filter net slot may extend in an up-and-down direction.

Further, the filter net slot is provided in the machine body 20, and the side wall 21 is provided with a filter net mounting port 203 for the filter net 30 to be inserted. As such, it is possible for the shell of the machine body 20 to provide physical protection for the filter net 30. In this technical scheme, when cleaning or replacing the filter net 30, the user can pull the filter net 30 out of the filter net slot through the filter net mounting port 203, and insert the filter net 30 into the filter net slot through the filter net mounting port 203 after cleaning or replacing.

As shown in FIGS. 4 to 8, the machine body 20 further includes a top cover 22 connected to an upper end of the side wall 21, and a water receiving tray 23 connected to a lower end of the side wall 21. The upper slot 202a is arranged on the top cover 22, and the lower slot 202b is arranged on the water receiving tray 23. That is, in this embodiment, the air inlet 201, the upper slot 202a, and the lower slot 202b are respectively arranged on the side wall 21, the top cover 22, and the water receiving tray 23, and the side wall 21, the top cover 22, and the water receiving tray 23 can be correspondingly processed during preparation, thereby reducing processing complexity of a single component and improving processing efficiency of the product. However, this design is not limited to this. In other embodiments, the upper slot 202a and the lower slot 202b can be arranged at the upper end and the lower end of the side wall 21.

Further, two upper guide rails 221 are formed on the top cover 22, being arranged side by side and spaced apart from each other, to form the upper slot 202a between the two upper guide rails 221. In this way, heights of the upper guide rails 221 can be conveniently set to meet a depth requirement of the upper slot 202a. In addition, compared with the technical scheme in which the upper slot 202a is recessed and molded on the top cover 22, a thickness of the top cover 22 is smaller, thereby saving the material required for the top cover 22 and reducing the cost of the product.

Similarly, two lower guide rails 231 are formed on the water receiving tray 23, being arranged side by side and spaced apart from each other, to form the lower slot 202b between the two lower guide rails 231. In this way, a depth requirement of the lower slot 202b can be conveniently met by setting heights of the lower guide rails 231. In addition, compared with the technical scheme in which the lower slot 202b is recessed and molded on the water receiving tray 23, a thickness of the water receiving tray 23 is smaller, thereby saving the materials required for the water receiving tray 23 and reducing the cost of the product.

Figure 2:
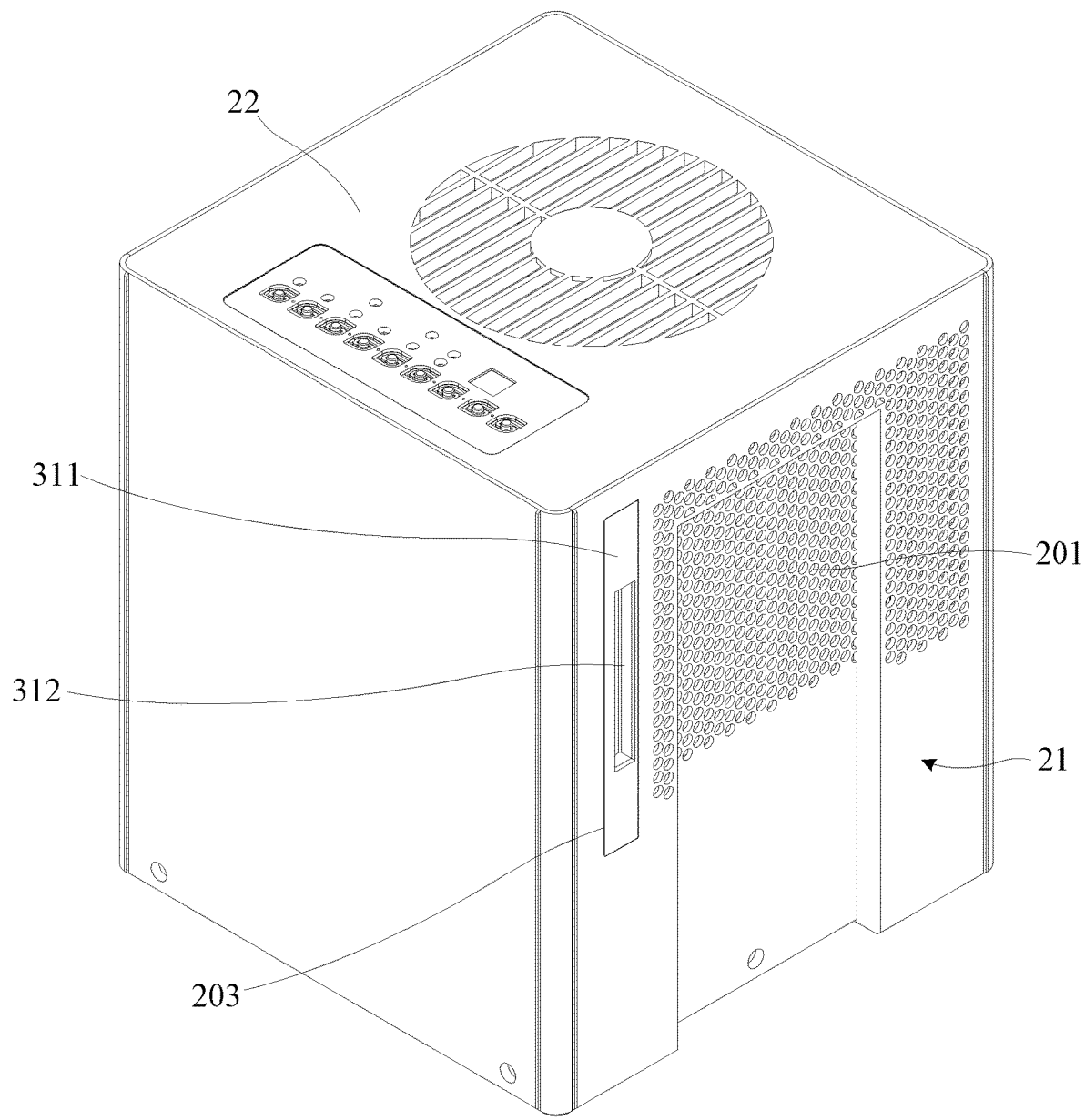
FIG. 2 is a schematic structural view of a machine body of the dehumidifier of FIG. 1 from a perspective.
Figure 3:
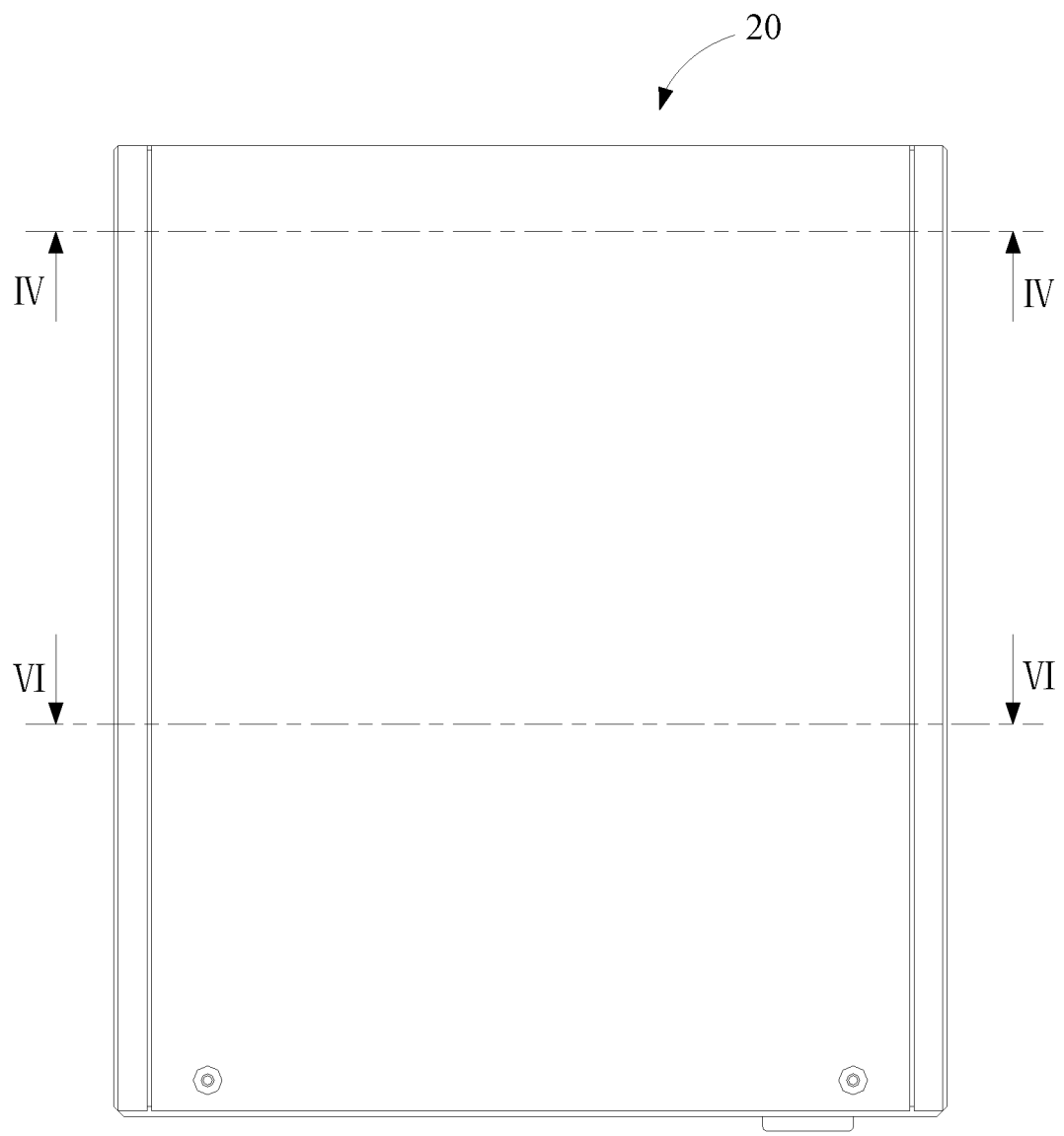
FIG. 3 is a schematic structural view of the machine body of FIG. 1 from another perspective.
Figure 4:
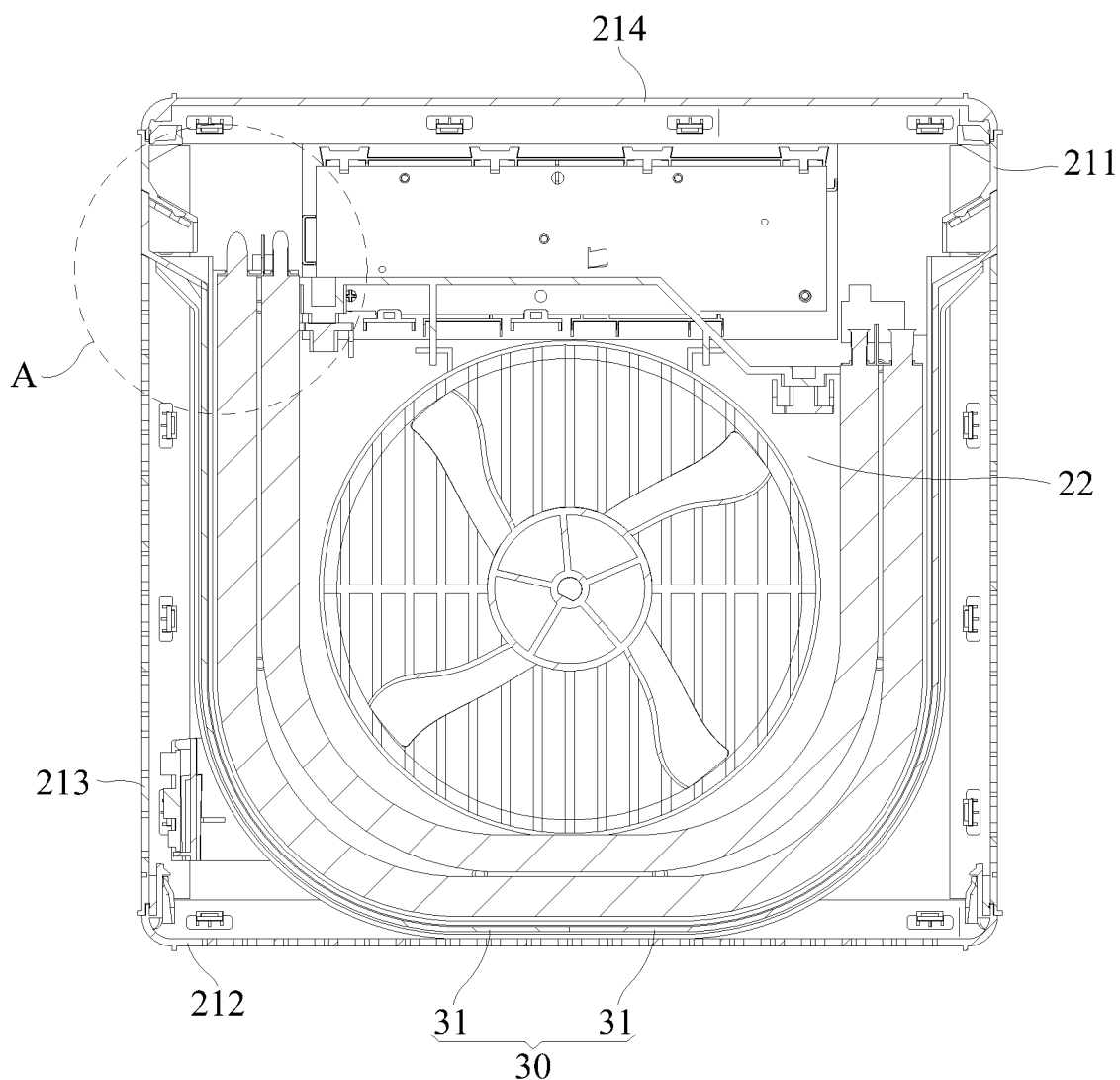
FIG. 4 is a schematic sectional view taken along line IV-IV in FIG. 3.
Figure 6:
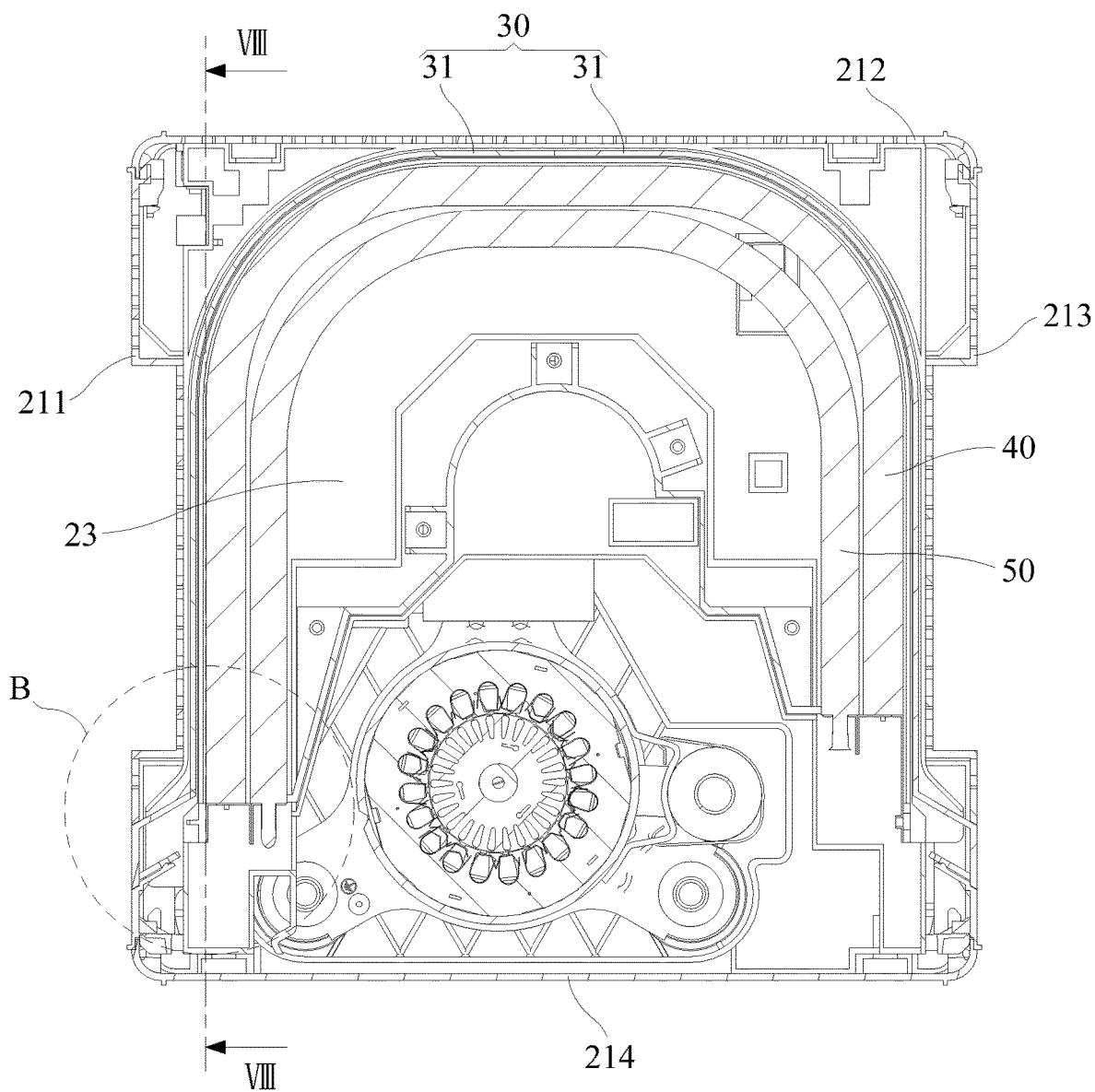
FIG. 6 is a schematic sectional view taken along line VI-VI in FIG. 3.

As shown in FIGS. 2, 4 and 6, further, the side wall 21 includes a first side wall 211, a second side wall 212 and a third side wall 213 connected in sequence, where the first side wall 211 is opposite to the third side wall 213, and the first side wall 211, the second side wall 212, and the third side wall 213 are all formed with an air inlet 201. In this way, a "three-sided air inlet" channel can be formed on the machine body 20, and an air treatment area can be increased compared with a "one-sided air inlet" channel, thereby improving the air treatment efficiency. In addition, by adopting a mode of "three-sided air inlet," an air inlet speed can be reduced under the same air volume, thus reducing the static pressure loss and enabling a fan in the machine body 20 to operate efficiently. In this embodiment, optionally, the air inlet 201 comprises a plurality of air inlet holes configured in an array. However, this design is not limited to this, in other embodiments, the air inlet 201 may be configured in a grid shape.

In this embodiment, optionally, a dehumidification device of the dehumidifier includes a compressor, an evaporator 40 and a condenser 50. First, water vapor in the air is condensed into water droplets by the evaporator 40 to remove water vapor in the air, and then the air after the water vapor is removed is heated and dried by the condenser 50 to restore blown air to normal temperature. Of course, in other embodiments, the dehumidification device can adopt a dehumidification method such as adsorption type. In this embodiment, the evaporator 40 is provided with a first evaporation section, a second evaporation section and a third evaporation section corresponding to the air inlet 201 on the first side wall 211, the second side wall 212 and the third side wall 213, respectively. The first evaporation section is opposite to the third evaporation section, that is, the evaporator 40 is approximately U-shaped.

As shown in FIGS. 2, 4 and 6, further, the filter net 30 includes two filter subnets 31 that are spliced in a circumferential direction of the machine body 20. One of the filter subnets 31 covers the air inlet 201 on the first side wall 211 and a part of the air inlet 201 on the second side wall 212. The other of the filter subnets 31 covers the other part of the air inlet 201 on the second side wall 212 and the air inlet 201 on the third side wall 213. Each of the first side wall 211 and the third side wall 213 is provided with a filter net mounting port 203 for the two filter subnets 31 to be mounted. Obviously, in this embodiment, the two filter subnets 31 each have their own mounting and dismounting ports, and each of the filter subnets 31 only needs to pass through one corner during the mounting process, that is, each of the filter subnets 31 only needs to be bent once. Compared with the technical scheme of only setting one integrated filter net 30, the mounting of the filter subnets 31 is more convenient. In this embodiment, the filter subnets 31 need to have certain flexibility, so that they can bend themselves and be suitable for loading during sliding along the filter slot for insertion. Of course, each of the filter subnets 31 also needs to have some rigidity in order to be pushed into the filter slot as a whole. Generally, each of the filter subnets 31 may be configured as a plastic filter net. Of course, each of the filter subnets 31 can include a plastic frame and a flexible filter net provided on the plastic frame. Optionally, the two filter subnets 31 are spliced in the middle of the second side wall 212, that is, the two filter subnets 31 are equal in length, so that the two filter subnets 31 can have same specifications and facilitate preparation.

Generally, the side wall 21 also includes a fourth side wall 214 opposite to the second side wall 212. The fourth side wall 214 is generally disposed against a wall. In this embodiment, the two filter net mounting ports 203 are respectively formed on the first side wall 211 and the third side wall 213, so that the filter subnets 31 can be assembled and disassembled without moving the dehumidifier, and the user can use the dehumidifier more conveniently. However, the present design is not limited to this. In other embodiments, the two filter net mounting ports 203 may be formed on the fourth side wall 214 to hide the filter net mounting ports 203 in a position invisible to the user. In this embodiment, optionally, in order to improve the insertion smoothness of the filter subnets 31, each of the first side wall 211 and the third side wall 213 is configured with an inclined transition channel communicating the filter net mounting port 203 and the filter net slot.

Figure 5:
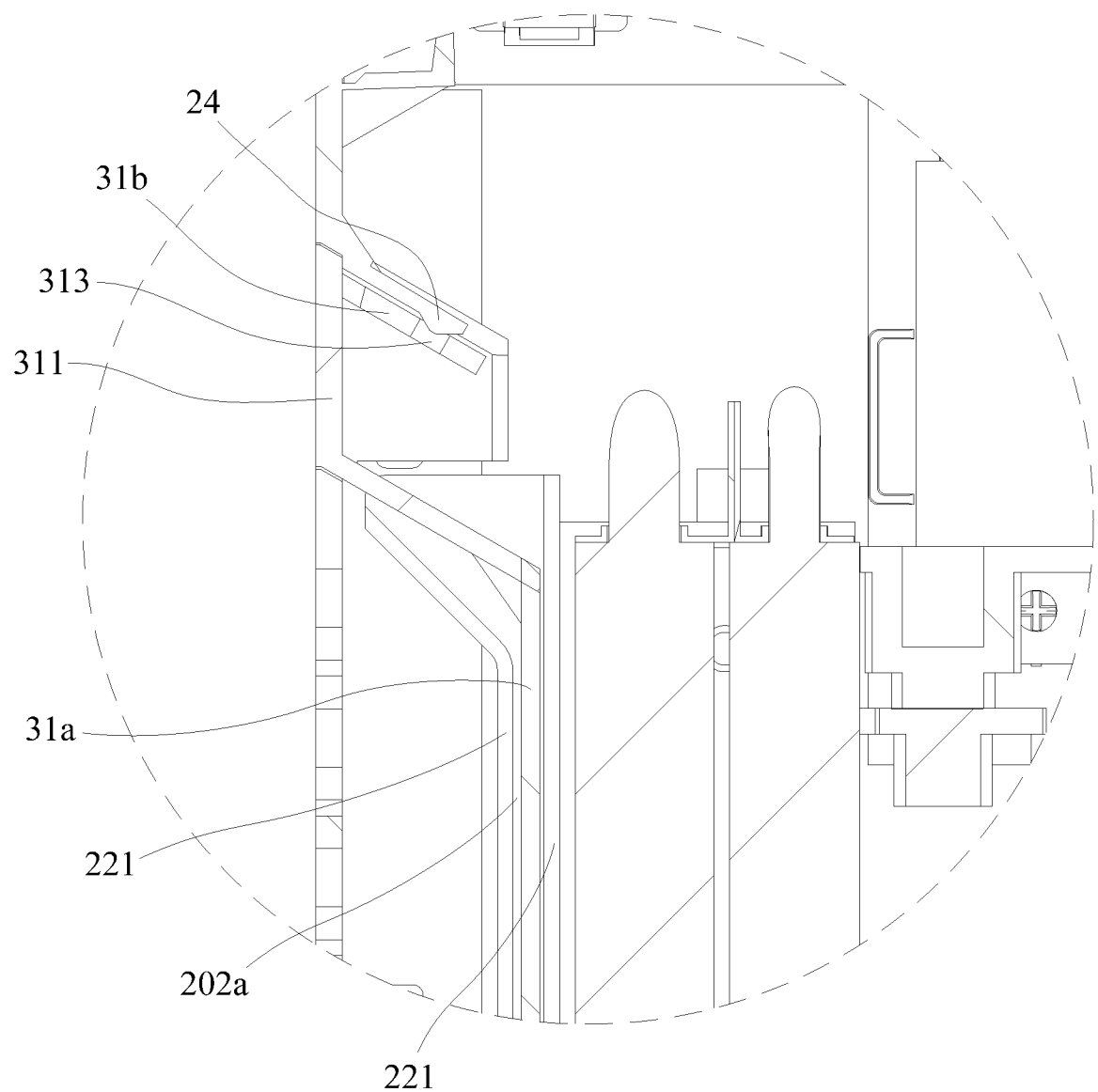
FIG. 5 is an enlarged view of portion A in FIG. 4.
Figure 7:
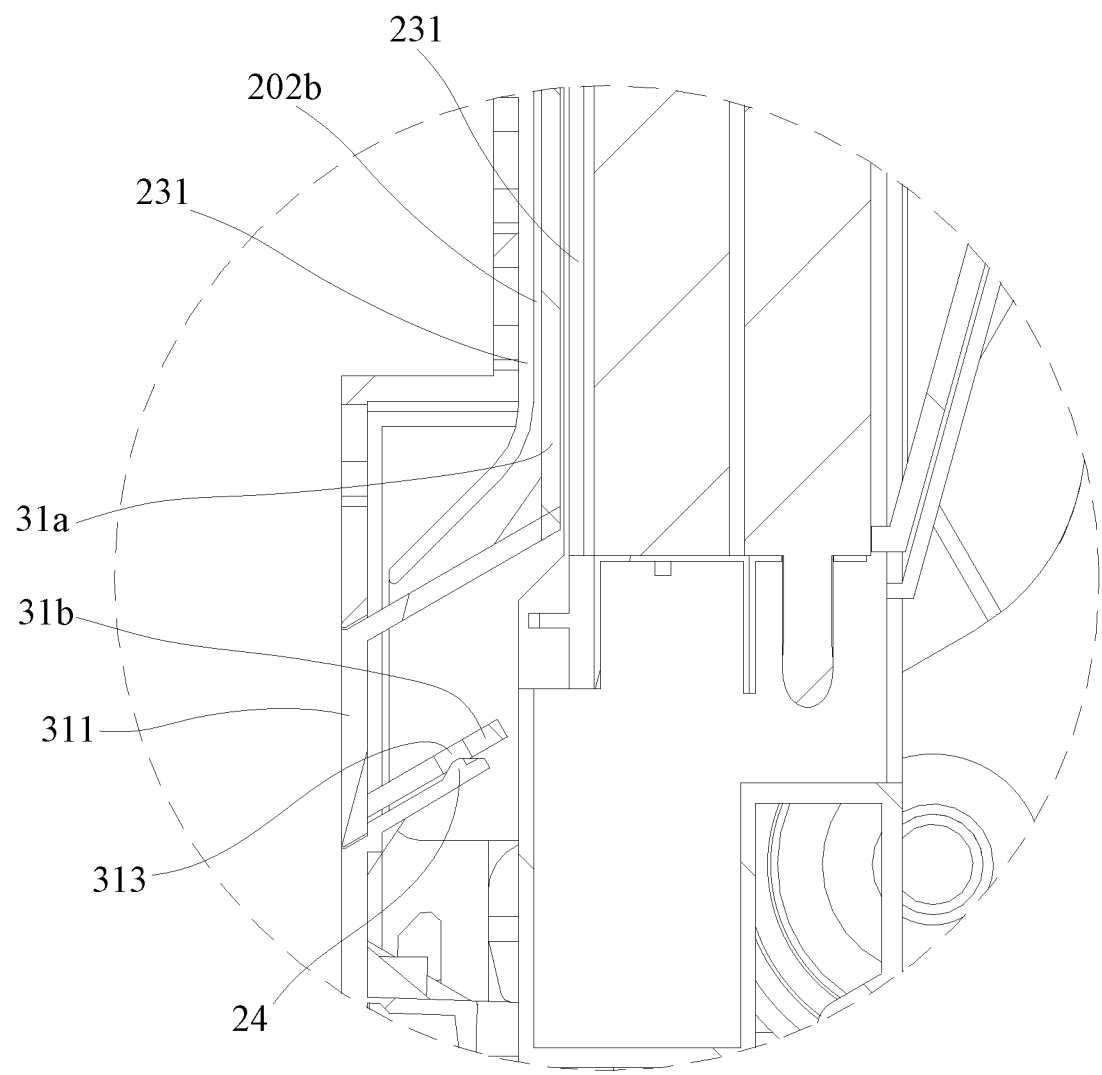
FIG. 7 is an enlarged view of portion B in FIG. 6.

As shown in FIGS. 2, 5 and 7, further, one end of each of the filter subnets 31 is configured with a blocking member 311, and the other end of the filter subnet 31 is inserted into the filter slot from the filter net mounting port 203 until the blocking member 311 blocks the filter net mounting port 203. It can be understood that the filter net mounting port 203 is blocked by the blocking member 311, so that particulate matters such as dusts can be prevented from entering the dehumidifier through the filter net mounting port 203.

Further, the blocking member 311 is provided with a handle 312 configured in a concave manner. In this way, the filter subnet 31 can be easily pulled out, and at the same time, the handle 312 is recessed, so that it avoids the situation that the handle 312 prevents the machine body 20 from being accommodated in the water tank 10. Of course, in other embodiments, the blocking member 311 may also be configured with a convex handle, as such, an avoidance notch is needed to be provided at the mounting port of the water tank 10, or the handle is needed to be provided at an upper position, and when the dehumidifier is in the idle state, the handle is exposed outside the water tank 10.

Further, an anti-disengagement structure is provided between each filter subnet 31 and the machine body 20, so that each filter subnet 31 can be positioned in the machine body 20 after being installed in the filter net slot, thereby preventing the filter subnet 31 from dropping out, and further improving assembly reliability of the filter subnet 31.

Further, the anti-disengagement structure includes a buckle hole 313 provided on the filter subnet 31, and a buckle 24 provided on an inner side of the filter mounting port 203. After the filter subnet 31 is installed in the filter net slot, the buckle 24 can be engaged to the buckle hole 313 to restrict the filter subnet 31 from leaving the filter net mounting port 203. In this embodiment, the buckle hole 313 can be provided on the filter net of the filter subnet 31 or on the blocking member 311 thereof. Optionally, the filter subnet 31 includes a subnet body 31a and a subnet flange 31b configured side by side on the same side of the blocking member 311. The buckle hole 313 is arranged on the subnet flange 31b. In this way, the buckle hole 313 can be prevented from damaging an overall structure of the subnet body 31a, and probability of tearing of the subnet body 31a can be reduced. In the technical scheme, the anti-disengagement structure is configured as a clamping structure, so that mounting and disassembly of the filter subnet 31 relative to the filter net mounting port 203 can be realized without additional tools (such as a screwdriver). However, the present design is not limited to this, in other embodiments, the anti-disengagement structure may be configured as, but not limited to, a screw-locking structure or the like.

Figure 8:
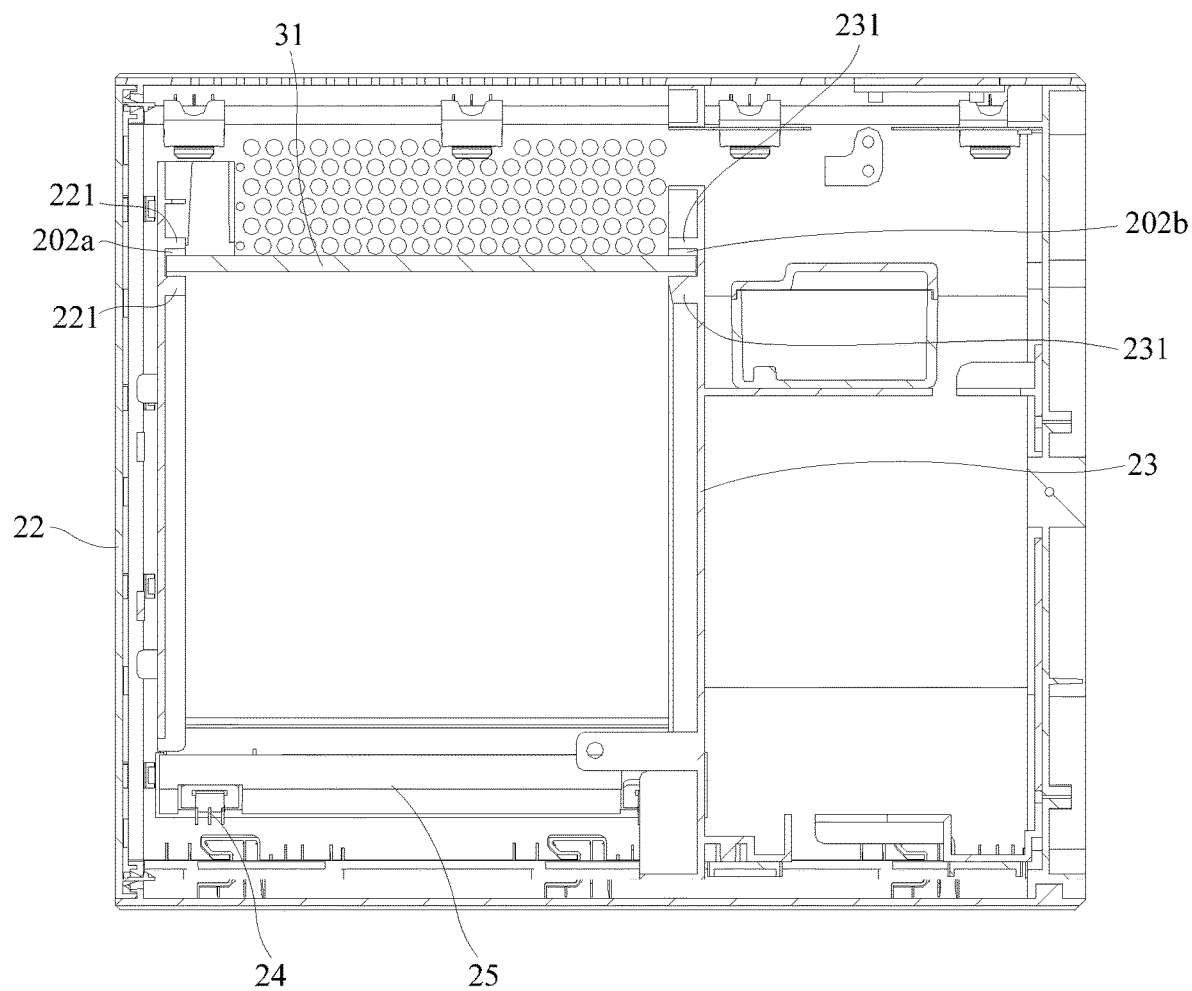
FIG. 8 is a schematic sectional view taken along line VIII-VIII in FIG. 6.

As shown in FIG. 8, further, a protective baffle 25 opposite to the filter net mounting port 203 and spaced apart from the filter net mounting port 203 is provided in the machine body 20. In this way, after the filter net 30 is pulled out, a user can be restricted by the protective baffle 25 from extending hands or other objects into the machine body 20 to touch an electronic control wiring, a pipeline of the evaporator 40 or the like in the machine body 20.

The above are only optional embodiments of the present application, and are not intended to limit the scope of the present application. All equivalent structural changes made under the inventive concept of the present application, using the contents of the specification and drawings of the present application, or direct/indirect application in other related technical fields are included in the claimed scope of the present application.

The invention claimed is:

1. A dehumidifier comprising:
a water tank with a mounting port facing upward;
a machine body including an air inlet and a filter net slot beside the air inlet, the machine body being configured to be in one of a plurality of states including:
an idle state in which the machine body is at least partially accommodated in the water tank through the mounting port; and
a working state in which the machine body is extended out relative to the water tank through the mounting port; and
a filter net removably inserted in the filter net slot and covering the air inlet.

2. The dehumidifier of claim 1, wherein:
the machine body includes a side wall;
the air inlet is formed on the side wall; and
the filter net slot includes an upper slot and a lower slot; and
an upper side of the filter net is configured to be inserted in the upper slot and a lower side of the filter net is configured to be inserted in the lower slot.

3. The dehumidifier of claim 2, wherein:
the filter net slot is provided in the machine body; and
the side wall is formed with a filter net mounting port through which the filter net is inserted into the machine body.

4. The dehumidifier of claim 3, wherein:
the machine body further includes:
a top cover connected to an upper end of the side wall; and
a water receiving tray connected to a lower end of the side wall; and
the upper slot is formed on the top cover and the lower slot is formed on the water receiving tray.

5. The dehumidifier of claim 4, wherein:
two upper guide rails are formed side by side on the top cover at an interval; and
the upper slot is formed between the two upper guide rails.

6. The dehumidifier of claim 4, wherein:
two lower guide rails are formed side by side on the water receiving tray at an interval; and
the lower slot is between the two lower guide rails.

7. The dehumidifier of claim 3, wherein:
the side wall includes a first side wall, a second side wall, and a third side wall connected in sequence, the first side wall being opposite to the third side wall;
the air inlet is one of a plurality of air inlet including a first air inlet formed at the first side wall, a second air inlet formed at the second side wall, and a third air inlet formed at the third side wall.

8. The dehumidifier of claim 7, wherein:
the filter net includes two filter subnets spliced in a circumferential direction of the machine body, one of the two filter subnets covering the first air inlet and a portion of the second air inlet, and another one of the two filter subnets covering another portion of the second air inlet and the third air inlet; and
each of the first side wall and the third side wall is formed with a filter net mounting port configured to load one of the two filter subnets.

9. The dehumidifier of claim 8, wherein one end of each of the two filter subnets is configured with a blocking member, and another end of each of the two filter subnets is configured to be inserted into the filter net slot through the filter net mounting port until the blocking member blocks the filter net mounting port.

10. The dehumidifier of claim 9, wherein the blocking member is configured with a handle formed in a concave manner.

11. The dehumidifier of claim 8, wherein an anti-disengagement structure is provided between each of the two filter subnets and the machine body.

12. The dehumidifier of claim 11, wherein the anti-disengagement structure of one filter subnets of the two filter subnets includes a buckle hole provided on the one filter subnet and a buckle provided on an inner side of the filter net mounting port, and the buckle is configured to be engaged in the buckle hole to restrict the one filter subnet from disengaging from the filter net mounting port.

13. The dehumidifier of claim 3, further comprising:
a protective baffle provided in the machine body, the protective baffle being spaced apart from the filter net mounting port and opposite to the filter net mounting port.

* * * * *